United States Patent [19]

Devic

[11] Patent Number: 5,124,171
[45] Date of Patent: Jun. 23, 1992

[54] REMOVAL OF PEROXIDE VALUES FROM BLEACHED/DRIED VEGETABLE MATTER

[75] Inventor: Michel Devic, Sainte-Foy-Les-Lyon, France

[73] Assignee: Atochem, Puteaux, France

[21] Appl. No.: 678,058

[22] Filed: Apr. 1, 1991

[30] Foreign Application Priority Data

Mar. 30, 1990 [FR] France ................. 90 04399

[51] Int. Cl.$^5$ .............................. A23L 1/214
[52] U.S. Cl. ........................ 426/640; 426/465
[58] Field of Search ............ 426/443, 465, 640

[56] References Cited

U.S. PATENT DOCUMENTS

| | | | |
|---|---|---|---|
| 2,882,609 | 4/1959 | Templeton | 426/465 |
| 3,009,817 | 11/1961 | Hendel | 426/465 |
| 4,135,309 | 1/1979 | Bosnjak | 426/465 |
| 4,246,289 | 1/1981 | Tu . | |
| 4,451,489 | 5/1984 | Beale | 426/640 |
| 4,496,597 | 1/1985 | Reges | 426/465 |
| 4,770,886 | 9/1988 | Lee | 426/481 |
| 4,859,487 | 8/1989 | Matsumura | 426/465 |
| 4,876,102 | 10/1989 | Feeney | 426/637 |
| 4,992,288 | 2/1991 | Olson | 426/640 |
| 5,023,097 | 6/1991 | Tyson | 426/443 |

FOREIGN PATENT DOCUMENTS 2455591 5/1976 Fed. Rep. of Germany .
62-111674 5/1987 Japan .
1555647 11/1979 United Kingdom .

OTHER PUBLICATIONS

Grant, 1969, Hackh's Chemical Dictionary, Fourth Edition, McGraw-Hill Book Co., New York, pp. 332-333.

*Primary Examiner*—Carolyn Paden
*Attorney, Agent, or Firm*—Burns, Doane, Swecker & Mathis

[57] ABSTRACT

The amount of peroxide contaminants in $H_2O_2$ bleached/dried vegetable material is reduced to a value on the order of less than about 1%, even approaching nil, by heat-treating such bleached/dried vegetable material at a temperature of at least 60° C. in a confined atmosphere such that its amount by weight of water remains essentially the same during the heat-treatment.

11 Claims, No Drawings

REMOVAL OF PEROXIDE VALUES FROM BLEACHED/DRIED VEGETABLE MATTER

BACKGROUND OF THE INVENTION

1. Field of the Invention

The present invention relates to the removal of residual peroxides from vegetable matter that has been bleached with hydrogen peroxide and then dried.

2. Description of the Prior Art

Vegetable matter bleached with $H_2O_2$ and then dried is obtained from pulps, cereals, seeds, flours, brans, fruits, including citrus fruits, or vegetables, depending on the particular case, after, e.g., the extraction or isolation of the normally reclaimable constituents therefrom, such as sugar, fruit juice, pectin, flour, starch or oil, etc.

Exemplary such original materials include sugar beets, wheat, corn oats, barley, apples, peaches, pears, apricots, peas and oil-containing plants such as the sunflower, soya, the groundnut and the coconut.

Bleaching of these materials can be carried out with the aid of hydrogen peroxide, for example by the process described in U.S. Pat. No. 4,241,093.

Matter bleached in this manner is reduced to the dry state, namely, devoid of any liquid content distinct from that in the solid matter. Its content by weight of water can then be approximately 20%, but in many cases, such as, for example, bleached flours or sugar beet pulp, such content does not exceed approximately 10% to 11%.

The vegetable matter thus bleached with hydrogen peroxide and then dried shall hereinafter be referred to as "vegetable fiber".

Such vegetable fiber is useful, in particular, for the production of foodstuffs and edible comestibles destined for human consumption, notably dietetic products.

The vegetable fibers have a residual peroxide content which is generally too high to be compatible with various requirements for human foods.

As utilized herein, by the term "peroxides" are intended hydrogen peroxide and the peroxidized precursors thereof.

The peroxide content of the ultimate foodstuffs must be extremely low, even nil if possible.

Any treatments of such foodstuffs before they are marketed to the consumer must be adapted to the constitution of the particular edible foodstuff in each case. Therefore, they are extremely diversified in their nature and specific treatments are required for each individual material making an overall processing operation very costly.

For example, the hydrogen peroxide present in various foodstuffs, in most cases, and furthermore those of animal origin, is removed in one instance by means of red algae or extracts thereof (see published Japanese Kokai 72/04,982), in another instance by means of a mixture of a compound of iron and of sugars (see published Japanese Kokai 77/07,388, and in yet another instance by means of catalase according to IIDA Toshiyuki, Fukumi Toru, Hokusuishi Geppo, 39(9), 242-255 (1982).

With regard to the removal of peroxides remaining in a vegetable matter after its bleaching with hydrogen peroxide, published Japanese Kokai 77/125,657 describes a process which, akin to those referred to above, requires the use of additives to the vegetable fiber, in this case water and the unbleached original vegetable matter. Such a process presents the dual disadvantage of dilution with water and a reversal of processing efficiency in respect of whiteness of the very matter, which has just been bleached and dehydrated.

SUMMARY OF THE INVENTION

According, a major object of the present invention is the provision of an improved process for removing objectionable hydrogen peroxide values from bleached and dried vegetable fibers, which improved process is generally applicable, does not adversely affect the quality of the treated vegetable fiber, in particular its dryness and its whiteness, and permits a reduction in hydrogen peroxide content, expressed as the amount of $H_2O_2$ by weight relative to the weight of the vegetable fiber, from a value, for example on the order of 1%, to a value close to zero.

Briefly, the present invention features a process for removing the peroxides which remain in vegetable matter after bleaching with hydrogen peroxide and then the drying thereof, comprising heat-treating such bleached/dried vegetable matter at a temperature above 60° C. in a confined atmosphere or treatment zone such that its weight content of water remains at its initial value during the said treatment.

DETAILED DESCRIPTION OF THE PREFERRED EMBODIMENTS OF THE INVENTION

More particularly according to the present invention by the term "vegetable matter bleached with hydrogen peroxide and then dried" is intended any matter defined above as vegetable fiber.

By "atmosphere" is intended either air or preferably an inert gas, typically nitrogen, with the heat treatment being carried out at atmospheric pressure or at the autogenous pressure under the treatment conditions selected.

By "water content is maintained at its initial value" is intended that the confined nature of the atmosphere is ensured as well as possible. In practice, bearing in mind the limitations of industrial equipment, it is also within the scope of the invention that the initial value of the water content of the vegetable fiber can decrease by up to approximately 20%.

Thus, the process of the invention enables the preparation of vegetable fibers essentially devoid of peroxide contaminants and which can be directly used for the production of foodstuffs and edible comestibles destined for human consumption.

The temperature selected for carrying out the heat treatment according to the invention normally does not exceed approximately 120°°C. and it preferably ranges from approximately 80° C. to approximately 100° C. For economic reasons, it is advantageous that it be close to that of the vegetable fiber as it is recovered from the drying stage downstream of the bleaching with hydrogen peroxide.

The period of time for the heat treatment can vary over wide limits and generally ranges from approximately 1 hour to 10 hours, essentially as a function of the initial peroxide content of the starting vegetable fiber, but also of the nature of said fiber. A lengthening of this treatment period is preferred vis-a-vis a risk of deterioration in the whiteness by using a higher temperature.

The process of the invention is particularly well suited for treating vegetable fibers having a pH ranging from 4 to 8.

This preferred pH more advantageously ranges from 5 to 7 in the case of vegetable fibers obtained from sugar beet pulps or vegetables, and from approximately 6 to 8 in the case of vegetable fibers of cereal origin.

The pH referred to is that of an aqueous suspension of vegetable fiber containing from 3% to 5% by weight of such fiber.

The process of the invention can be carried out continuously or discontinuously in apparatus which is preferably equipped with a system permitting a homogeneous temperature within the vegetable fiber, for example using mechanical stirring or fluidization.

In order to further illustrate the present invention and the advantages thereof, the following specific examples are given, it being understood that same are intended only as illustrative and in nowise limitative.

In said examples to follow, by the terms "vegetable fibers", "peroxides" and "pH" are intended the same definitions as heretofore ascribed thereto. The peroxides and the pH are expressed and/or measured as indicated above. The water content is reported in % by weight. The whiteness of the vegetable fiber before and after the heat treatment in a confined atmosphere was measured using a reflectometer, at 457 nm, according to the ISO standard of the papermaking industry, and expressed in degrees ISO (°ISO).

EXAMPLE 1

A vegetable fiber obtained by bleaching and drying a sugar beet pulp, in which the hydrogen peroxide was introduced during the bleaching operation in a proportion of 10% by weight relative to the weight of pulp, expressed as dry solids, had a peroxide content of 0.47%, a water content of 5%, a pH of 5.6 and a whiteness of 35.7 DISO measured on such vegetable fiber after having been milled into a flour.

The above vegetable fiber was subjected to the heat treatment according to the invention in a confined air atmosphere at 90° C. for 2 hours (Test 1a) and 6 hours (Test 1b), respectively.

The results of the two treatments are reported in the Table below:

TABLE

| Test No. | Treated vegetable fiber | | |
|---|---|---|---|
| | Peroxides (%) | Water (%) | Whiteness °ISO |
| 1a | 0.08 | 5 | |
| 1b | 0* | 5 | 39.2 |

*Not detectable by chemical determination

EXAMPLE 2

Another vegetable fiber obtained by the bleaching and drying of a sugar beet pulp as in Example 1 had a peroxide content of 0.66%, a water content of 7% and a whiteness of 41 °ISO.

After a heat treatment carried out as in Example 1 for 2 hours at 90° C. in a confined air atmosphere, the vegetable fiber had a peroxide content of only 0.02%, whereas its water content remained unchanged and its whiteness was 41.2 °ISO.

EXAMPLE 3

A vegetable fiber constituted by a wheat bran bleached with the aid of hydrogen peroxide and dried, had a peroxide content of 0.37%, a water content of 11%, a pH of 7.2 and a whiteness of 47.7 .°ISO.

After treatment as in the preceding examples, but carried out for 3 hours, the vegetable fiber had a peroxide content which was now only 0.08%, whereas its water content remained unchanged and its degree of whiteness was 48.3 °ISO

EXAMPLE 4

A vegetable fiber constituted by a corn bran bleached with the aid of hydrogen peroxide and dried, had a peroxide content of 1.4%, a water content of 8.3%, a pH of 6.5 and a whiteness of 48.3 °ISO.

After heat treatment, also in a confined air atmosphere as in the preceding examples but for 1 hour at 100° C., the vegetable fiber had a peroxide content reduced to 0.17%, the same water content as initially and a degree of whiteness of 49.7 °ISO.

From the above examples, it is clearly apparent that the efficiency of removal of peroxides from vegetable fibers heat-treated according to the invention not only does not decrease the initial whiteness thereof, but even results in an improvement in most cases. Another advantage of the process of the invention is the fact that the vegetable fibers having the peroxides removed therefrom can be directly used for the production of comestibles and foodstuffs destined for human consumption.

While the invention has been described in the terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the removal of peroxide contaminants from vegetable matter that has been bleached with hydrogen peroxide and then dried, comprising heat-treating such bleached/dried vegetable matter at a temperature of at least 60° C. in a confined atmosphere in order to remove peroxide contaminants in a manner such that the amount by weight of water of said vegetable matter remains essentially the same during said heat-treatment.

2. The process as defined by claim 1, comprising heat-treating at a temperature ranging from 60° C. to 120° C.

3. The process as defined by claim 2, said temperature ranging from 80° C. to 100° C.

4. The process as defined by claim 1, said confined atmosphere comprising air or an inert gas, at either atmospheric or autogenous pressure.

5. The process as defined by claim 1, comprising heat-treating for from 1 to 10 hours.

6. The process as defined by claim 1, such bleached/dried vegetable matter having a pH ranging from 4 to 8.

7. The process as defined by claim 1, such bleached/dried vegetable matter having a pH ranging from 5 to 7.

8. The process as defined by claim 7, such bleached/dried vegetable matter comprising sugar beet or vegetable fiber.

9. The process as defined by claim 1, such bleached/dried vegetable matter having a pH ranging from 6 to 8.

10. The process as defined by claim 9, such bleached/dried vegetable matter comprising a cereal.

11. The vegetable matter product of the process as defined by claim 1.

* * * * *